J. DIAFERIA.
BANANA CRATE.
APPLICATION FILED JULY 26, 1912.
1,155,406.
Patented Oct. 5, 1915.
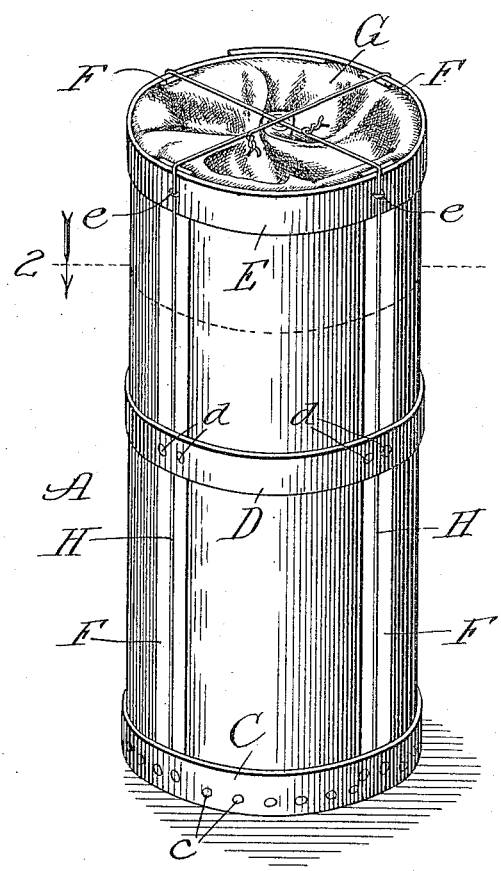
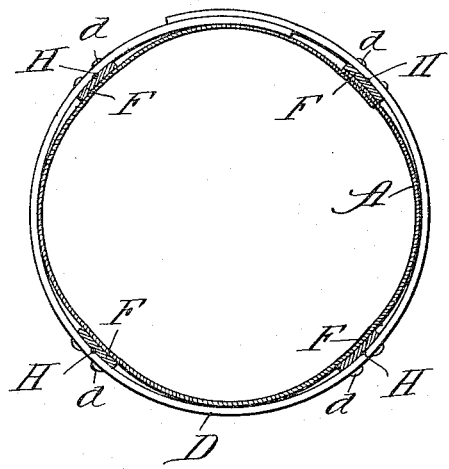
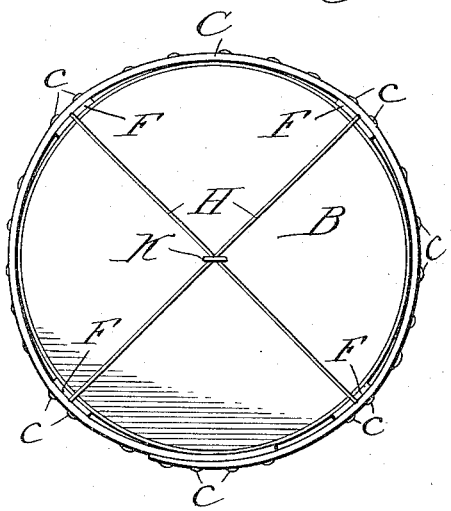
Witnesses:
Inventor:
Joseph Diaferia

UNITED STATES PATENT OFFICE.

JOSEPH DIAFERIA, OF CHICAGO, ILLINOIS, ASSIGNOR TO FRANK CUNEO, OF CHICAGO, ILLINOIS.

BANANA-CRATE.

1,155,406.

Specification of Letters Patent.

Patented Oct. 5, 1915.

Application filed July 26, 1912. Serial No. 711,698.

*To all whom it may concern:*

Be it known that I, JOSEPH DIAFERIA, a citizen of the United States, and a resident of the city of Chicago, county of Cook, and State of Illinois, have invented certain new and useful Improvements in Banana-Crates, of which I do declare the following to be a full, clear, and exact description, reference being had to the accompanying drawing, forming part of this specification.

The present invention has for its object to provide a simple, strong and effective construction of crate for the shipping of bunches of bananas.

To this end, the invention consists in the features of novelty hereinafter described, illustrated in the accompanying drawing and particularly pointed out in the claims at the end of this specification.

My present invention has relation more particularly to that class of crates for carrying bunches of bananas. Heretofore banana crates of this character have been made consisting of drums or cylinders adapted to receive a bunch of bananas, the top of the drum being provided with a flexible cover of paper secured to the upper edge of the drum and adapted to be drawn in and tied about the stem or stalk of the bunch of bananas. A difficulty found with this class of banana crates is, that if the sheet of paper becomes wet, as is frequently the case, it is apt to readily tear, so that when the bunch of bananas is lifted by the stem, there is danger of the drum dropping away from the bananas. Moreover, with this class of crates, if the weight of the bunch of bananas rests upon the bottom of the crate and the crate be lifted by its upper portion, there is danger of the bottom falling out and thus permitting the bananas to fall from the crate.

My present invention is designed to obviate the above mentioned difficulties. This is accomplished, primarily, by providing a banana crate having a bottom, vertical strips and a top hoop with wires or cords extending from the bottom to the top of the crate and across the top thereof, these cords or wires serving as bails whereby the crate with its contents may be carried.

Figure 1 is a perspective view of a banana crate embodying my invention. Fig. 2 is a view in horizontal section on line 2—2 of Fig. 1. Fig. 3 is a bottom view of the crate.

Banana crates of the character to which my invention relates, are sometimes made simply as open frames, but, preferably, comprise cylindrical bodies inclosed by hoops and vertical stay strips. As shown, the body A of my improved crate is formed of a sheet of flexible material, such, for example, as a good quality of cardboard, the edges of which are brought together and connected preferably at a point opposite one of the vertical strips of the crate. The bottom B of the crate is of wood and is attached to the cylindrical body A by nails c that pass through the bottom hoop C that encircles the body at the bottom. A central hoop D and a top hoop E also encircle the body A of the crate.

Upon the outside of the body A and within the several hoops, extend a plurality of vertical strips F of thin wood, these strips being nailed to the several hoops in any suitable or convenient manner.

To the top of the body A is secured the cover G that is preferably formed of a sheet of tough paper, this paper being preferably passed around the body A adjacent its upper end. This cover G is of sufficient fullness, so that after the bunch of bananas has been placed within the crate, the cover G may be drawn or tucked in around the stem or stalk of the bunch; or, if the bunch be short, the cover G may be simply tucked in over the top of the bunch.

Down the sides of the crate, and preferably outside the vertical strips F, extend the wires H. Four of these wires H are shown extending along the sides of the crate and, preferably, the wires H at opposite sides are formed in one piece and are extended across the bottom B of the crate and beneath the crown of a staple K that securely connects the wires to the bottom B at its center. By preference, the wires H extend inside the bottom hoop C, as by this arrangement the nails c at each side of the wire H serve to prevent the displacement of the wire and, similarly, the wires H extend inside the central hoop D and between the nails d that connect the central hoop to the vertical strips F.

The upper portions of the wires F are preferably arranged outside the top hoop E and pass through staples e that connect the wires to the hoops. This arrangement of the wires on the outside of the top hoop is preferred, as the top hoop thus prevents the drawing together of the wires when they are used in lifting the crate and its contents. The upper ends of the wires F are preferably free, so as to permit the bunch of bananas to be readily inserted into the crate; but, after the bunch of bananas has been placed within the crate, the cover G will be tucked or folded in and the free ends of the wires F will be brought together and twisted around one another, so as to form a bail or bails whereby the crate may be lifted. When the bunch of bananas has been placed within the crate, and the cover G has been tucked in either around the stem or stalk of the bunch or over it, and the free ends of the wires have been twisted together, a most effective means is afforded whereby the crate and its contents may be lifted. The wires also effectively serve to prevent the bottom B dropping out of the crate in event the strain of the bunch of bananas is thrown thereon; and, in fact, the wires serve to take the lifting strain and thus avoid the danger of the breakage of the crate. Moreover, when the free ends of the wires F are twisted together over the top of the cover G, they will effectively serve to hold the cover in place and will guard against any tampering with the bananas within the crate.

While, without departing from the scope of my invention, cords might be used instead of the wires F, still I regard the use of the wires as preferable. I wish the term "wires", however, as used in the following claims, to be understood as covering cords or similar suspension devices that may be substituted therefor, and, while I prefer that the upper ends of the wires shall be free, it is obvious that this is not essential, so long as the wires extend to a sufficient distance above the top to form the bails.

Having thus described my invention, what I claim as new, and desire to secure by Letters Patent, is:

1. A cylindrical open topped banana crate comprising a bottom, a top hoop, vertical side strips secured to said bottom and said top hoop, bracing wires secured to said bottom and extending upwardly over and in contact with the outer faces of said vertical side strips, said wires being fastened to the upper portion of the crate and having extended ends adapted to be connected across the open top thereof, substantially as described.

2. A cylindrical open topped banana crate comprising a bottom, a top hoop, vertical side strips secured to said bottom and said top hoop, and bracing wires extending across and beneath said bottom and upwardly over and in contact with the outer faces of said vertical side strips, said wires being fastened to said top hoop and having extended end portions adapted to be connected across the open top of the crate, substantially as described.

JOSEPH DIAFERIA.

Witnesses:
JAMES H. PEIRCE,
KATHARINE GERLACH.

Copies of this patent may be obtained for five cents each, by addressing the "Commissioner of Patents, Washington, D. C."